United States Patent [19]
Yowler et al.

[11] Patent Number: 6,088,623
[45] Date of Patent: Jul. 11, 2000

[54] SYSTEM AND METHOD FOR LEVELING AN APPARATUS

[75] Inventors: Michael Alan Yowler, St. Paris; Ayman Z. Hajmousa, Dayton, both of Ohio

[73] Assignee: Spectra Precision, Inc., Dayton, Ohio

[21] Appl. No.: 08/953,115

[22] Filed: Oct. 17, 1997

[51] Int. Cl.[7] .............................. G05B 19/18; G01C 9/02
[52] U.S. Cl. .............................................. 700/56; 356/248
[58] Field of Search .............................. 702/154; 356/249, 356/248, 247, 250; 33/291, 290; 700/56, 59, 60

[56] References Cited

U.S. PATENT DOCUMENTS

| | | | |
|---|---|---|---|
| 3,936,197 | 2/1976 | Aldrink et al. | 356/250 |
| 4,062,634 | 12/1977 | Rando et al. | 356/248 |
| 4,221,483 | 9/1980 | Rando | 356/250 |
| 4,662,707 | 5/1987 | Teach et al. | 350/6.5 |
| 4,895,440 | 1/1990 | Cain et al. | 356/5 |
| 5,144,486 | 9/1992 | Hart | 359/629 |
| 5,257,279 | 10/1993 | Dugan et al. | 372/101 |
| 5,375,663 | 12/1994 | Teach | 172/4.5 |
| 5,513,001 | 4/1996 | Ohtomo et al. | 356/249 |
| 5,517,023 | 5/1996 | Ohtomo et al. | 250/234 |
| 5,636,018 | 6/1997 | Hirano et al. | 356/248 |

FOREIGN PATENT DOCUMENTS

| | | |
|---|---|---|
| 0 643 283 A1 | 3/1995 | European Pat. Off. . |
| 6-201383 | 7/1994 | Japan . |

OTHER PUBLICATIONS

MinuteMarker General Construction/Interior Laser System Model 1462 Brochure, Published Oct. 26, 1996.

*Primary Examiner*—William Grant
*Assistant Examiner*—Steven R. Garland
*Attorney, Agent, or Firm*—Killworth, Gottman, Hagan & Schaeff, L.L.P.

[57] ABSTRACT

A system and method for leveling an apparatus are provided. The position of the apparatus with respect to a pair of intersecting axes is determined by sensors positioned along each axis. The position of the apparatus is adjusted about a second set of axes by first and second leveling devices. The data from each of the sensors is transformed to new position data which corresponds to the position of the apparatus with respect to the second set of axes. The apparatus may be leveled automatically through direct control of the first and second leveling devices. The apparatus may also be leveled manually through the use of an indicator device which indicates the necessary adjustments for the first and second leveling devices.

27 Claims, 8 Drawing Sheets

SYSTEM AND METHOD FOR LEVELING AN APPARATUS

CROSS-REFERENCES TO RELATED APPLICATIONS

This application is related to commonly assigned U.S. Pat. No. 5,994,688, issued Nov. 30, 1999; U.S. Pat. No. 5,867,522, issued Feb. 2, 1999; U.S. Pat. No. 5,805,362, issued Sep. 8, 1998; U.S. Pat. No. 5,977,534, issued Nov. 2, 1999; and U.S. Pat. No. 5,844,679, issued Dec. 1, 1998, the disclosures of which are incorporated herein by reference.

BACKGROUND OF THE INVENTION

The present invention generally relates to a leveling system and, in particular, to a system for rough leveling a laser transmitter.

Laser light systems have been employed in numerous surveying and construction applications. In one such system, a laser light transmitting device provides a rotating laser beam which establishes a reference plane. In effect, the rotating laser beam is used to define a plane of light that acts as either a horizontal elevational reference or a sloped elevational reference, as desired, over an entire work area. The laser light is detected either by the naked eye or by one or more laser beam detectors, placed at considerable distances from the transmitting device. Various construction tasks may be performed based on visual perception of the laser light. Similarly, detectors may be used to intercept the rotating laser beam and determine a desired elevation and grade at selected points throughout the work area.

In the laser light transmitting device, the plane of light is produced by projecting the beam generally upward and then deflecting the beam ninety degrees within a pentaprism or penta-mirror assembly. The pentaprism assembly is rotated about a vertical axis within the transmitting device to cause the beam to rotate, thereby defining the reference plane. The laser light transmitting device must be substantially level in order to function properly and to define the desired reference frame accurately. The beam of light which is projected upward will be substantially plumb with respect to the ground when the laser transmitting device is substantially level.

Prior art devices have included standard leveling vials attached to the housing of the laser light transmitting device to indicate to the transmitter operator that the transmitter is badly misaligned, and to permit manual adjustment of the transmitter to a more level position. Such leveling vials include a bubble suspended within a liquid medium, with the bubble position providing a rough indication of the degree of level of the housing. Leveling screws are included on the housing which may be adjusted by the operator to level the base. An automatic compensator may also be used to optically compensate for slight misalignments of the housing. In one type of automatic compensator, a compensator cup is suspended by thin wires within the housing of the device, with a compensating lens in the cup positioned in the path of the upwardly projected laser light. The compensator will automatically shift laterally so as to adjust the position of the laser beam so that it has a plumb orientation with respect to the ground as it emerges from the compensator. To function properly and have an effect on the orientation of the laser beam, the compensator must be within a certain degree of level, e.g., 12 minutes, in order to swing freely.

A disadvantage of such prior art devices is that the initial leveling of the housing is dependent, in part, upon the skill of the operator. Further, manual leveling of the laser light transmitting device within 12 minutes may be tedious and time consuming. In addition, since the leveling operation is completed with respect to the housing, the alignment between the housing and the compensator must be precise. Further, the leveling vials are mounted on the outside of the housing making them susceptible to damage while the elements adversely affect performance. The leveling vials are also difficult to see in low light.

Other prior art systems include motor driven automatic leveling devices which attempt to level the laser light transmitting device based on a signal from an electronic leveling vial. The electronic leveling vials are similar to the standard leveling vials except the electronic leveling vials emit a signal representative of the relative position of the vial. The signal is then used to level the housing of the laser light transmitting device to within 12 minutes so that the compensator may then adjust the position of the laser beam to a plumb orientation. A disadvantage of such systems is that the leveling activities are completed with respect to the housing instead of the compensator. For accurate leveling so that the compensator is within 12 minutes of level, the alignment between the compensator and the housing must be precise.

Furthermore, leveling measurements are typically generated with respect to pair of orthogonal axes. However, the position of the housing may be adjusted with respect to a different set of axes thereby complicating the entire leveling operation as the measurements are taken along the one set of axes while leveling is performed along the other set of axes. Adjustments with respect to one of the other set of axes typically change the position of the housing along both of the measurement axes such that the adjustment may adversely affect leveling along an unintended axis.

Accordingly, there is a need for a method and an accurate system for leveling an apparatus in which the position of the apparatus is measured with respect to one set of axes while the leveling operation is performed with respect to another set of axes. Preferably, such a method and system is applied to the leveling of a laser light transmitter. There is also a need for a method and a leveling system in which leveling adjustments do not adversely affect leveling along an unintended axis. Preferably, such methods and leveling systems are inexpensive and easy to implement.

SUMMARY OF THE INVENTION

The present invention meets the aforementioned needs by providing a position sensor in a laser transmitter for accurately leveling the same. A pair of sensors determine the relative position of the laser transmitter along a set of axes. Signals from the sensors are processed and transformed to indicate a direction to adjust the position of the laser transmitter with respect to another set of axes. Preferably, adjusting the position of the laser transmitter along one of these axes does not adversely affect leveling along the other of these axes. The system may also be configured to automatically level the laser transmitter based on the signals from the sensors.

According to a first aspect of the present invention, an apparatus comprises a housing, a first position detector generating a first position signal representative of a position of the housing with respect to an X-axis, a second position detector generating a second position signal representative of a position of the housing with respect to a Y-axis which intersects the X-axis, a leveling assembly coupled to the housing for adjusting a position of the housing with respect to the X-axis and with respect to the Y-axis, and a processor.

The leveling assembly comprises a first leveling device for adjusting the position of the housing with respect to a first axis and a second leveling device for adjusting the position of the housing with respect to a second axis. The first axis is offset from the X-axis by a first predetermined number of degrees ($\theta$) while the second axis is offset from the Y-axis by a second predetermined number of degrees $\phi$). The processor is programmed to perform a transformation in response to the first and second position signals to produce a leveling signal. The leveling signal is used for adjusting the first and second leveling devices about the first and second axes, respectively, so that the housing is substantially level with respect to the X-axis and the Y-axis.

The transformation may comprise a first transformation function for use in adjusting one of the first and second leveling devices and a second transformation function for use in adjusting the other of the first and second leveling devices. The first transformation function is carried out according to the equation: $y_1 = y \sin(\phi) - x \cos(\phi)$, where, $y_1$ defines the position of the housing with respect to the second axis, x defines the position of the housing with respect to the X-axis, and y defines the position of the housing with respect to the Y-axis. The second transformation function is carried out according to following equations:

$$x_1 = x \cos(\phi) + y \sin(\phi), \text{ and}$$

$$x_2 = x_1 \cos(\theta - \phi) + y_1 \sin(\theta - \phi),$$

where, $x_1$ defines the position of the housing with respect to an intermediate axis, and $x_2$ defines the position of the housing with respect to the first axis. The first axis may be separated from the second axis by about 120 degrees. The first predetermined number of degrees may be about 30 and the second predetermined number of degrees may be about 60.

The first leveling device may comprise a first motor and the second leveling device may comprise a second motor with the first and second motors receiving the leveling signal from the processor such that the processor automatically controls the position of the housing with respect to the first and second axes so that the housing is substantially level with respect to the X-axis and with respect to the Y-axis. Alternatively, the first leveling device may comprise a first rotatable knob and the second leveling device may comprise a second rotatable knob. The apparatus may then further comprise an indicator device having a first display representation for the first rotatable knob and a second display representation for the second rotatable knob. The indicator device receives the leveling signal from the processor and indicates a direction to rotate the first and second rotatable knobs to adjust the position of the housing with respect to the first and second axes so that the housing is substantially level with respect to the X-axis and with respect to the Y-axis. The X-axis may be substantially orthogonal to the Y-axis.

According to another aspect of the present invention, a laser transmitting device comprises a housing, a laser light source coupled to the housing and generating laser light, a compensator assembly coupled to the housing, a first compensator assembly position detector, a second compensator position detector, and a processor. The compensator assembly receives and projects the laser light along a projection axis. The first compensator assembly position detector generates a first position signal representative of a position of the compensator assembly with respect to an X-axis while the second compensator assembly position detector generates a second position signal representative of a position of the compensator assembly with respect to a Y-axis which intersects the X-axis. The leveling assembly is coupled to the housing for adjusting a position of the housing with respect to the X-axis and with respect to the Y-axis. The leveling assembly comprises a first leveling device for adjusting the position of the housing with respect to a first axis and a second leveling device for adjusting the position of the housing with respect to a second axis. The first axis is offset from the X-axis by a first predetermined number of degrees ($\theta$) and the second axis is offset from the Y-axis by a second predetermined number of degrees ($\phi$). The processor is programmed to perform a transformation in response to the first and second signals to produce a leveling signal which is used for adjusting the first and second leveling devices about the first and second axes, respectively, so that the compensator assembly is substantially level with respect to the X-axis and the Y-axis.

The transformation may comprise a first transformation function for use in adjusting one of the first and second leveling devices and a second transformation function for use in adjusting the other of the first and second leveling devices. The first transformation function is carried out according to the equation: $y_1 = y \sin(\phi) - x \cos(\phi)$, where, $y_1$ defines the position of the compensator assembly with respect to the second axis, x defines the position of the compensator assembly with respect to the X-axis, and y defines the position of the compensator assembly with respect to the Y-axis. The second transformation function is carried out according to the following equations:

$$x_1 = x \cos(\phi) + y \sin(\phi), \text{ and}$$

$$x_2 = x_1 \cos(\theta - \phi) + y_1 \sin(\theta - \phi),$$

where, $x_1$ defines the position of the compensator assembly with respect to an intermediate axis, and $x_2$ defines the position of the compensator assembly with respect to the first axis. The first axis may be separated from the second axis by about 120 degrees. The first predetermined number of degrees may be about 30 while the second predetermined number of degrees may be about 60.

The first leveling device may comprise a first motor and the second leveling device may comprise a second motor with the first and second motors receiving the leveling signal from the processor such that the processor automatically controls the position of the housing with respect to the first and second axes so that the compensator assembly is substantially level with respect to the X-axis and with respect to the Y-axis. Alternatively, the first leveling device may comprise a first rotatable knob and the second leveling device may comprise a second rotatable knob. The laser transmitting device may further comprise an indicator device having a first display representation for the first rotatable knob and a second display representation for the second rotatable knob. The indicator device may receive the leveling signal from the processor and in response to the leveling signal indicate a direction to rotate the first and second rotatable knobs to adjust the position of the housing with respect to the first and second axes so that the compensator assembly is substantially level with respect to the X-axis and with respect to the Y-axis. The X-axis may be substantially orthogonal to the Y-axis.

According to yet another aspect of the present invention, a laser transmitting device comprises a housing, a laser light source coupled to the housing and generating laser light, a compensator assembly coupled to the housing, a first compensator assembly position detector, a second compensator assembly position detector, a leveling assembly, and an indicator device. The compensator assembly receives and projects the laser light along a projection axis. The first compensator assembly position detector generates a first position signal representative of a position of the compensator assembly with respect to an X-axis and a second compensator assembly position detector generates a second position signal representative of a position of the compensator assembly with respect to a Y-axis which intersects the X-axis. The leveling assembly is coupled to the housing for adjusting a position of the housing with respect to the X-axis and with respect to the Y-axis. The leveling assembly comprises a first leveling device having a first rotatable knob coupled thereto for adjusting the position of the housing with respect to a first axis and a second leveling device having a second rotatable knob coupled thereto for adjusting the position of the housing with respect to a second axis. The first axis is offset from the X-axis by a first predetermined number of degrees ($\theta$) and the second axis is offset from the Y-axis by a second predetermined number of degrees ($\phi$). The indicator device includes a first display representation for the first rotatable knob and a second display representation for the second rotatable knob. The indicator device indicates a direction to rotate the first and second rotatable knobs in response to the first and second position signals to adjust the position of the housing with respect to the first and second axes so that the compensator assembly is substantially level with respect to the X-axis and with respect to the Y-axis.

According to a further aspect of the present invention, a laser transmitting device comprises a housing, a laser light source coupled to the housing and generating laser light, a compensator assembly coupled to the housing, a first compensator assembly position detector, a second compensator assembly position detector, a leveling assembly, a processor, and an indicator device. The compensator assembly receives and projects the laser light along a projection axis. The first compensator assembly position detector generates a first position signal representative of a position of the compensator assembly with respect to an X-axis while the second compensator assembly position detector generates a second position signal representative of a position of the compensator assembly with respect to a Y-axis which intersects the X-axis. The leveling assembly is coupled to the housing for adjusting a position of the housing with respect to the X-axis and with respect to the Y-axis. The leveling assembly comprises a first leveling device having a first rotatable knob coupled thereto for adjusting the position of the housing with respect to a first axis and a second leveling device having a second rotatable knob coupled thereto for adjusting the position of the housing with respect to a second axis. The first axis is offset from the X-axis by a first predetermined number of degrees ($\theta$) and the second axis is offset from the Y-axis by a second predetermined number of degrees ($\phi$). The processor is programmed to perform a transformation in response to the first and second position signals to produce a leveling signal. The transformation is carried out according to the following equations:

$$y_1 = y \sin(\phi) - x \cos(\phi);$$

$$x_1 = x \cos(\phi) + y \sin(\phi); \text{ and}$$

$$x_2 = x_1 \cos(B\theta - \phi) + y_i \sin(\theta - \phi);$$

where, $y_1$ defines the position of the compensator assembly with respect to the second axis, $x_1$ defines the position of the compensator assembly with respect to an intermediate axis, $x_2$ defines the position of the compensator assembly with respect to the first axis, x defines the position of the compensator assembly with respect to the X-axis, and y defines the position of the compensator assembly with respect to the Y-axis. The indicator device includes a first display representation for the first rotatable knob and a second display representation for the second rotatable knob. The indicator device indicates a direction to rotate the first and second rotatable knobs in response to the leveling signal from the processor to adjust the position of the housing with respect to the first and second axes so that the compensator assembly is substantially level with respect to the X-axis and with respect to the Y-axis.

According to a still further aspect of the present invention, a process for leveling a housing with respect to intersecting X and Y axes in which a position of the housing is adjusted with respect to a first axis offset from the X-axis by a first predetermined number of degrees ($\theta$) and a second axis offset from the Y-axis by a second predetermined number of degrees ($\phi$) comprises determining the position of the housing with respect to the X-axis and the Y-axis and generating position data representative thereof. The position data is transformed to transformation data representative of the position of the housing with respect to the first axis and the second axis. The position of the housing is then adjusted with respect to the first axis and second axis based on the transformation data so that the housing is substantially level with respect to the X-axis and the Y-axis.

The step of transforming the position data to transformation data representative of the position of the housing with respect to the first axis and the second axis may comprise determining the transformation data according to the following equations:

$$y_1 = y \sin(\phi) - x \cos(\phi);$$

$$x_1 = x \cos(\phi) + y \sin(\phi); \text{ and}$$

$$x_2 = x_1 \cos(\theta - \phi) + y_1 \sin(\theta - \phi);$$

where, $y_1$ defines the position of the housing with respect to the second axis, $x_1$ defines the position of the housing with respect to an intermediate axis, $x_2$ defines the position of the housing with respect to the first axis, x defines the position of the housing with respect to the X-axis, and y defines the position of the housing with respect to the Y-axis. The step of adjusting the position of the housing with respect to the first axis and second axis based on the transformation data may be performed manually or automatically. The step of adjusting the position of the housing with respect to the first axis and second axis based on the transformation data may comprise indicating a direction to adjust the position of the housing with respect to the first axis and with respect to the second axis. The step of indicating a direction to adjust the position of the housing with respect to the first axis and with respect to the second axis may comprise indicating a first direction to rotate a first rotatable knob coupled to a first leveling device for adjusting the position of the housing with respect to the first axis and indicating a second direction to rotate a second rotatable knob coupled to a second leveling device for adjusting the position of the housing with respect to the second axis.

According to another aspect of the present invention, a process for leveling a housing with respect to intersecting X and Y axes in which a position of the housing is adjusted with respect to a first axis offset from the X-axis by a first predetermined number of degrees ($\theta$) and a second axis offset from the Y-axis by a second predetermined number of degrees ($\phi$) comprises determining the position of the housing with respect to the X-axis and the Y-axis and generating position data representative thereof, and indicating a direction to adjust the housing with respect to the first axis and with respect to the second axis in response to the position data.

According to yet another aspect of the present invention, a process for adjusting a position of a laser transmitter with respect to a first axis and a second axis comprises generating laser light from a light source. The laser light is directed along a projection axis using a compensator assembly coupled to the laser transmitter. A position of the compensator assembly is determined with respect to an X-axis and a Y-axis and position data representative thereof is generated. The X-axis intersects the Y-axis, the first axis is offset from the X-axis by a first predetermined number of degrees (θ) and the second axis is offset from the Y-axis by a second predetermined number of degrees (φ). The position data is transformed to transformation data representative of the position of the compensator assembly with respect to the first axis and the second axis. The position of the laser transmitter with respect to the first axis and second axis is adjusted based on the transformation data so that the laser transmitter is substantially level with respect to the X-axis and the Y-axis. The step of transforming the position data to transformation data representative of the position of the compensator assembly with respect to the first axis and the second axis may comprise determining the transformation data according to the following equations:

$$y_1 = y \sin(\phi) - x \cos(\phi);$$

$$x_1 = x \cos(\phi) + y \sin(\phi); \text{ and}$$

$$x_2 = x_1 \cos(\theta - \phi) + y_1 \sin(\theta - \phi);$$

where, $y_1$ defines the position of the compensator assembly with respect to the second axis, $x_1$ defines the position of the compensator assembly with respect to an intermediate axis, $x_2$ defines the position of the compensator assembly with respect to the first axis, x defines the position of the compensator assembly with respect to the X-axis, and y defines the position of the compensator assembly with respect to the Y-axis.

Accordingly, it is an object of the present invention to provide a method and a leveling system in which the leveling measurements are taken along one set of axes while the leveling operation is performed with respect to another set of axes. It is another object of the present invention to provide a method and a leveling system which is independent of the alignment between the compensator and the housing. It is a further object of the present invention to provide a method and a leveling system in which leveling adjustments do not adversely affect leveling along an unintended axis. It is a still further object of the present invention to provide a method and leveling system which is inexpensive and easy to implement. Other objects and advantages of the invention will be apparent from the following description, the accompanying drawings and the appended claims.

DETAILED DESCRIPTION OF THE INVENTION

Figure 1:
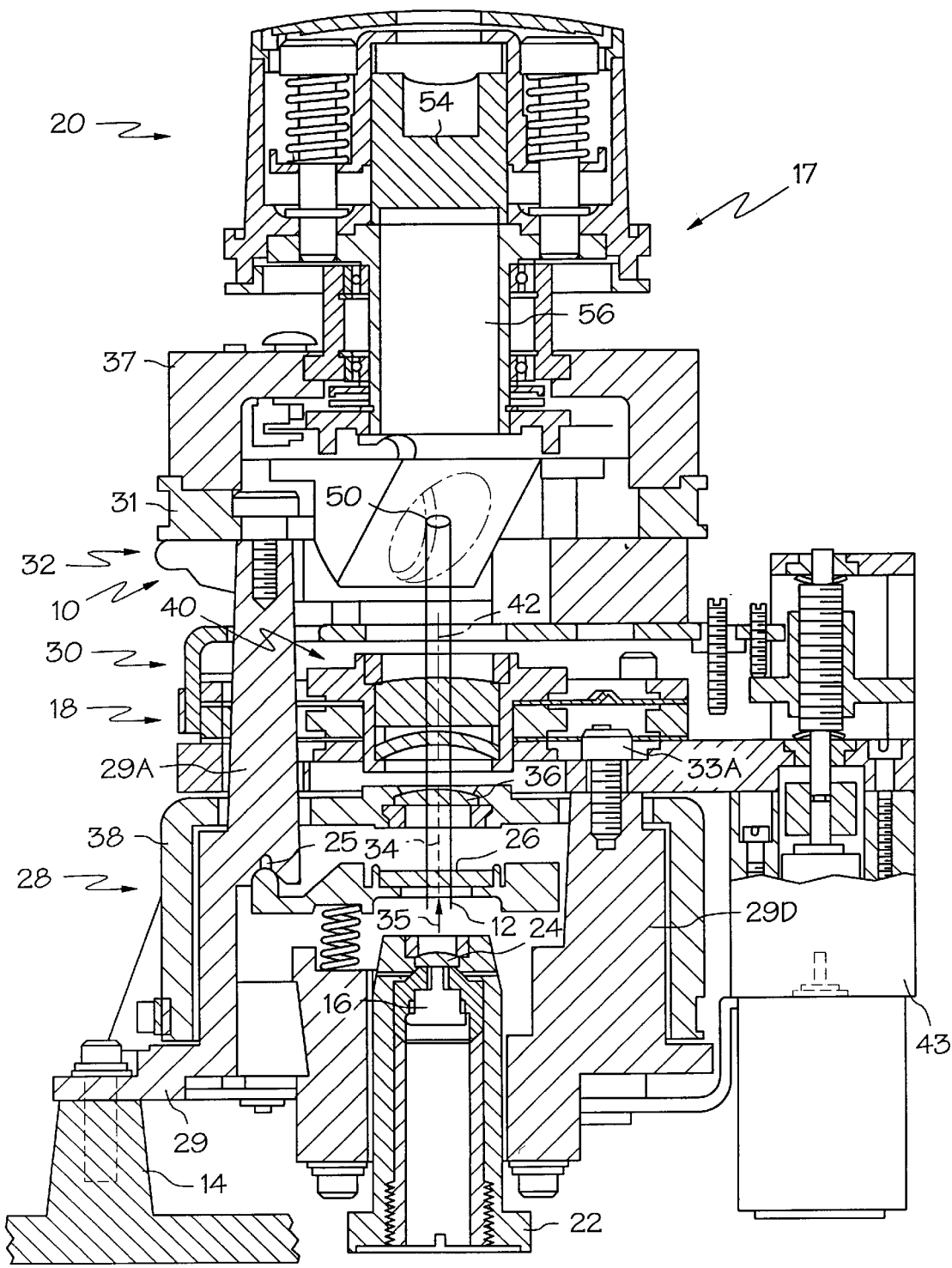
FIG. 1 is a cross-sectional view of a laser transmitter according to the present invention.

Referring now to FIG. 1, a laser transmitter 10 for transmitting a beam of laser light 12 is shown. The laser transmitter 10 includes a housing 14, a light source 16, an optical assembly 18 and an optical projecting device 20. The light source 16 is coupled to an assembly 22. According to the illustrated embodiment, the light source 16 is a laser diode which generates the beam of laser light 12. The assembly 22 includes a collection lens 24 that is positioned above the light source 16. The collection lens 24 serves to collect the laser beam 12 and project it in a first direction 35. Preferably, the collection lens 24 is a planar convex lens which collimates the laser beam 12.

The optical assembly 18 includes a flat window 26, a compensator assembly 28 and a focusing mechanism 30. The compensator assembly 28 includes an optics frame 29, a compensator cup 38 and a wire clamp ring 31. The optics frame 29 is coupled to and supported by the housing 14. The assembly 22 is coupled to the optics frame 29. The flat window 26 is positioned above the collection lens 24. The flat window 26 is pivotally coupled to the optics frame 29 through a spherical pivot 25. The flat window 26 tilts along an X-axis and a Y-axis using two calibration screws (not shown). The position of the flat window 26 is finely adjusted by the calibration screws so that the laser beam 12 is projected along substantially vertical axis or projection axis 34. The laser beam 12 will therefore be plumb when the optics frame 29 is positioned along a plane which is substantially parallel with respect to the plane of the ground, i.e. substantially level. A plumb beam of light is light which is projected substantially vertical with respect to the ground. The laser beam 12 is projected along the projection axis 34 by the light source 16 and the collection lens 24 and made plumb through the flat window 26. It should be apparent that the laser beam will be plumb as long as the optics frame 29 is substantially level with respect to the ground.

Figure 2:
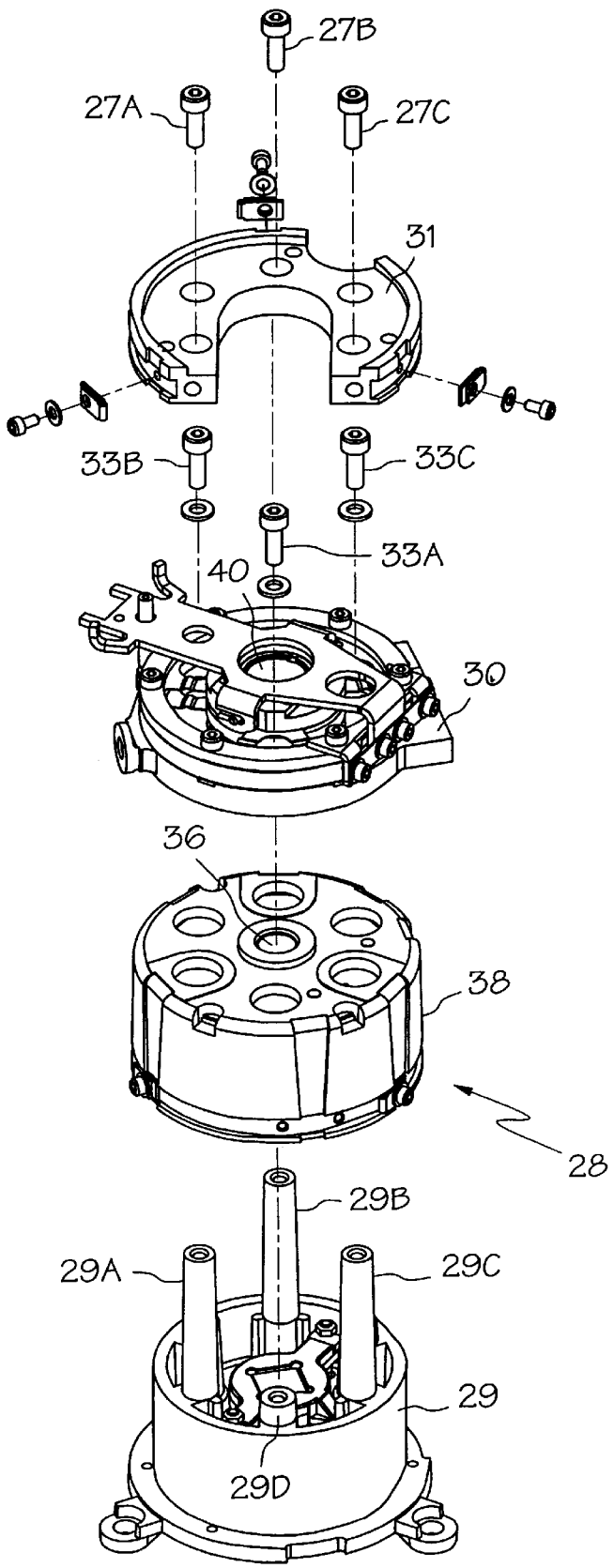
FIG. 2 is an exploded view of a compensator assembly shown in FIG. 1.

The compensator assembly 28 optically adjusts the position of the laser beam 12 so that it is plumb even when the optics frame 29 is not substantially level. As shown in FIG. 2, the compensator assembly 28 includes a compensating lens 36 mounted in the center of the compensator cup 38. The compensator cup 38 is positioned above the flat window 26 and swings freely on three wires (not shown) which are attached to the wire clamp ring 31. The wire clamp ring 31 is coupled to the optics frame 29 through three posts 29A, 29B, 29C by fasteners 27A, 27B, 27C. The compensator cup 38 is free to translate laterally when it is within a certain degree of level. In the illustrated embodiment, the compensator cup 38 is free to translate when it is within 12 minutes of level. As long as the compensator cup 38 is within 12 minutes of level, the compensating lens 36 may translate along the X and Y axes and optically adjust the position of the laser beam 12 so that it is plumb as it emerges from the compensator cup 38. The compensator cup 38 is suspended from the wire clamp ring 31 which is coupled to the optics frame 29 of the compensator assembly 28, so that once the compensator assembly 28 is within 12 minutes of level, the compensator cup 38 is also within 12 minutes of level. The compensator lens 36 may then optically adjust the position of the laser beam 12 so that it is plumb as it emerges from the compensator cup 38. The compensator assembly 28 therefore compensates optically for misalignments of the optics frame 29 which are within 12 minutes of level. It should be apparent that the flat window 26 and the compensator assembly 28 function to project the laser beam 12 along projection axis 34, either singularly or in tandem.

The focusing mechanism 30 is positioned above the compensator cup 38 and coupled to the optics frame 29 through three small posts (only one post 29D shown) by three fasteners 33A, 33B, 33C. The three posts 29A, 29B, 29C of the optics frame 29 pass through the focusing mechanism 30 so that the focusing mechanism 30 does not contact the compensator cup 38. The focusing mechanism 30 includes a focusing lens 40 which is translated along the projection axis 34 to adjust the focus of the laser beam 12. The focusing mechanism 30 is positioned so that the projection axis 34 coincides with an optical axis 42 of the focusing lens 40. A plumb beam of laser light 12 is focused by the focusing mechanism 30 along the optical axis 42. The focusing mechanism 30 includes a focus motor 43 coupled to the focusing lens 40. The focus motor 43 is adapted to change the position of the focusing lens 40, thereby adjusting the focus of the laser beam 12. The focusing mechanism 30 is described in detail in copending application, U.S. Ser. No. 08/834,473 FOCUSING MECHANISM USING A THIN DIAPHRAGM, filed Apr. 11, 1997, by Hayes, herein incorporated by reference. It will be appreciated by those skilled in the art that another focusing mechanism may be used without departing from the scope of the present invention. It will be further appreciated by those skilled in the art that the present invention may be practiced with or without the focusing mechanism 30.

The wire clamp ring 31 is positioned above the focusing mechanism 30. The wire clamp ring 31 is the upper most portion of the compensator assembly 28. The wire clamp ring 31 includes the three wires (not shown) for suspending the compensator cup 38. All of the optical components are coupled to either the optics frame 29 or the wire clamp ring 31. Consequently, the compensator assembly 28 is the main frame of reference for the laser transmitter 10.

Referring to FIGS. 1 and 2, the optical projecting device 20 is coupled to the wire clamp ring 31 through a mounting ring 37. The optical projecting device includes a motor (not shown) and a pentaprism 54 within a spindle 56. The optical projecting device 20 is positioned above the focusing mechanism 30 to deflect the laser beam 12 ninety degrees with respect to vertical. The pentaprism 54 is a structure which deflects incoming light at a ninety-degree angle with respect to the direction of the incoming light, within limits, regardless of the precise orientation of the pentaprism 54. Consequently, the incoming light does not have to hit the pentaprism 54 at an exact location in order to be deflected ninety degrees. The pentaprism 54 is rotated within the spindle 56 by the motor at a speed of approximately 50 rpm to define a substantially horizontal plane of light. A speed of 50 rpm is well suited for visible perception of the laser light 12 by the user. However, as will be appreciated by those skilled in the art the pentaprism 54 may be rotated at any reasonable speed without departing from the scope of the present invention. While a pentaprism is used in the illustrated embodiment to deflect the incoming light, other light deflecting devices, such as a pentamirror, mirror, prism, reflector or refractor may also be used. While the laser transmitter 10 has been described with the laser light 12 being transmitted upwards, it will be appreciated by those skilled in the art that optical components may be shifted appropriately so that the laser light 12 is transmitted downwards, with the optical projecting device 20 being the lower most component and the light source 16 and assembly 22 being the upper most components. It will be further appreciated by those skilled in the art that the compensator cup 38 may be locked in place with the laser transmitting device 10 positioned on its side so as to project a generally vertical beam of light.

Figure 3:
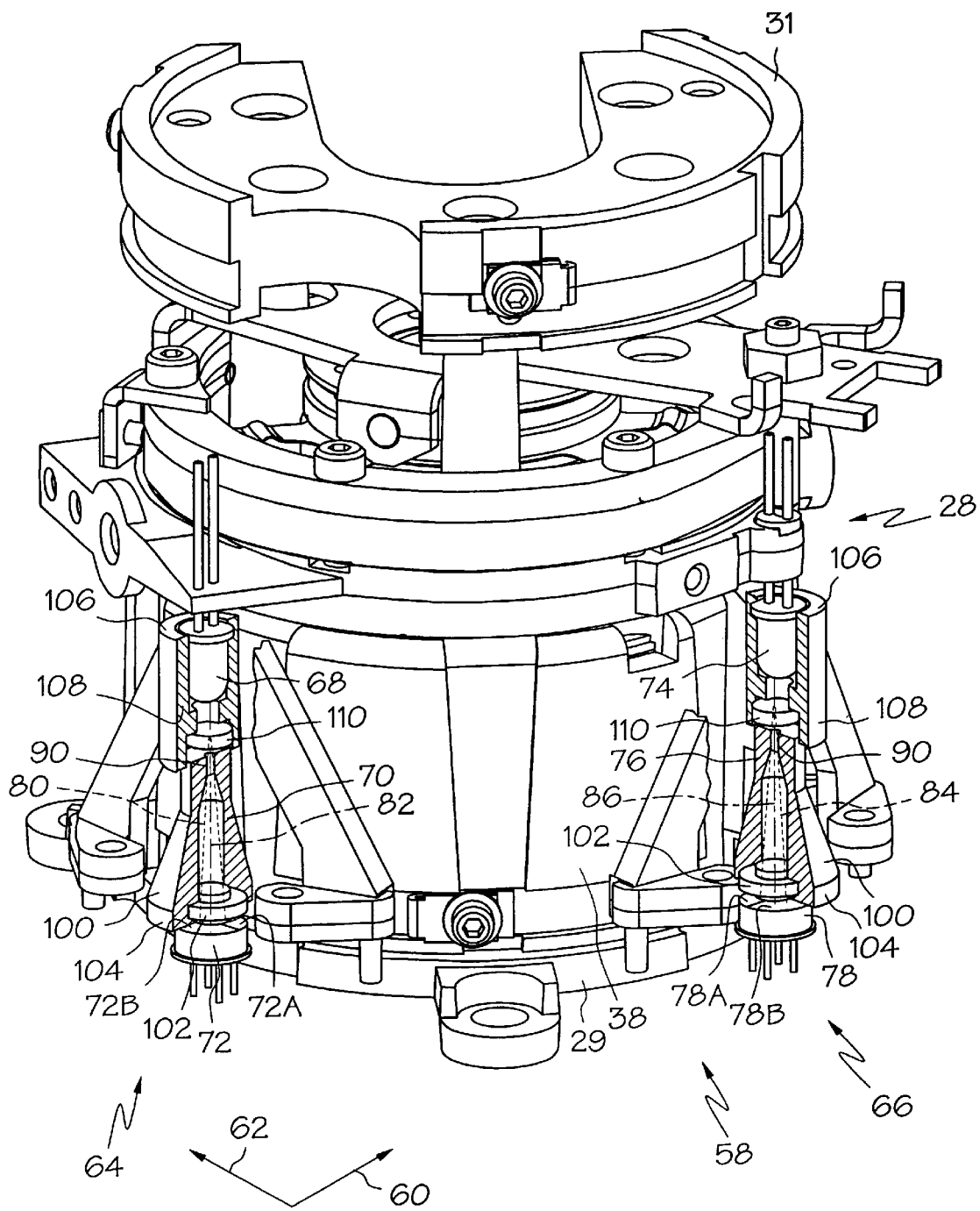
FIG. 3 is a perspective view of a compensator assembly position detector according to a first embodiment of the present invention.

The laser light 12 emerging from the pentaprism 54 will be substantially horizontal as long as the incident laser light 12 is plumb as stated above. The incident laser light 12 will be plumb as long as the compensator assembly 28 is within 12 minutes of level. As shown in FIG. 3, a compensator assembly position detector 58 is used to detect the position of the compensator assembly 28 with respect to an X-axis 60 and a Y-axis 62. In the illustrated embodiment, the X-axis 60 is substantially perpendicular to the Y-axis 62. However, it will be appreciated by those skilled in the art that the X and Y axes 60, 62 may be offset from each other by a reasonable number of degrees. The compensator assembly position detector 58 includes a first position detector 64 for detecting the position of the compensator assembly 28 with respect to the X-axis 60 and a second position detector 66 for detecting the position of the compensator assembly 28 with respect to the Y-axis 62. The first position detector 64 is separated from the second position detector 64 by approximately ninety degrees as measured from the center of the compensator cup 38. The first position detector 64 comprises a first light source 68, a first optical element 70 and a first photodetector 72. The second position detector 66 comprises a second light source 74, a second optical element 76 and a second photodetector 78. The first light source 68 and the first photodetector 72 are coupled to the optics frame 29 and remain fixed, while the first optical element 70 is coupled to the compensator cup 38 and moves with the same. Similarly, the second light source 74 and the second photodetector 78 are coupled to the optics frame 29 and remain fixed, while the second optical element 76 is coupled to the compensator cup 38 and moves with the same.

Figure 4:
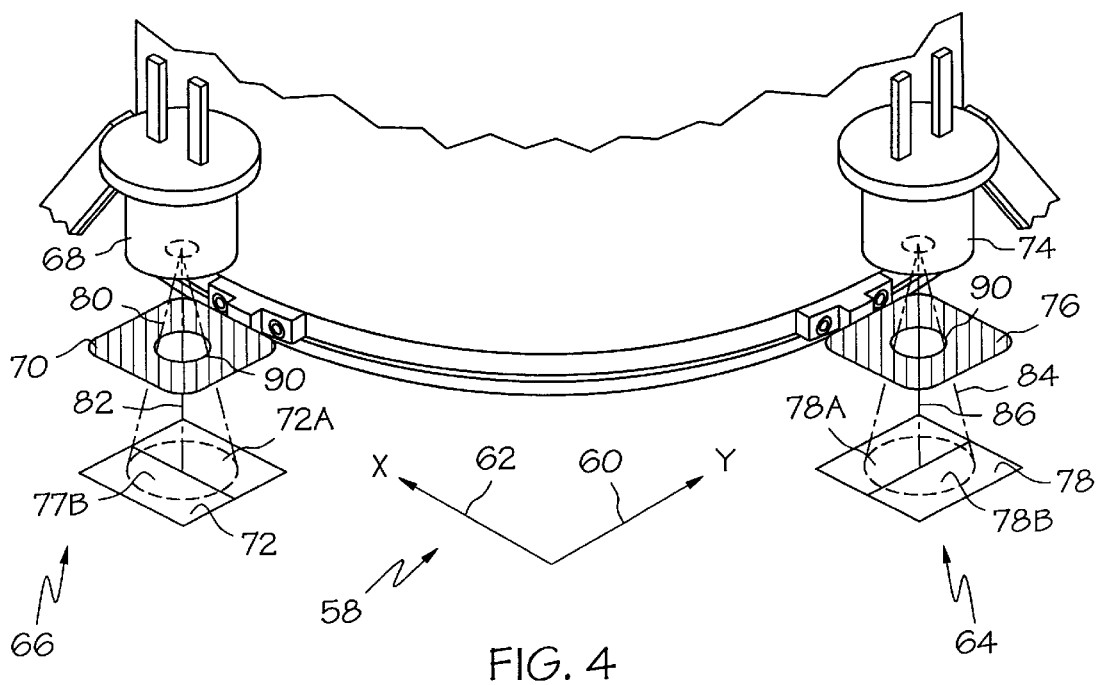
FIG. 4 is a schematic view of the compensator assembly position detector of FIG. 3.

As shown in FIG. 4, the first light source 68 projects a first light 80 along a first optical axis 82 while the second light source 74 projects a second light 84 along a second optical axis 86. The first optical element 70 and the first photodetector 72 are positioned such that the first photodetector 72 receives the first light 80 which is passed through the first optical element 70. Similarly, the second optical element 76 and the second photodetector 78 are positioned such that the second photodetector 78 receives the second light 84 which is passed through the second optical element 76. As shown in the illustrated embodiment, the first optical element 66 and the first photodetector 68 are aligned along the first optical axis 72 while the second optical element 76 and the second photodetector 78 are aligned along the second optical axis 86. It will be appreciated by those skilled in the art that the first optical element 70 and the first photodetector 72 may be aligned along different axes without departing from the scope of the present invention. The exact alignment of the first light source 68, the first optical element 70 and the first photodetector 72 is dependent, in part, on the configuration of the first optical element 70 as described herein. The same is true for the second light source 74, the second optical element 76 and the second photodetector 78.

As shown in FIG. 4, the first and second photodetectors 72, 78 each comprise a dual cell photodetector. The first photodetector 72 is aligned along the Y-axis 62 so that it can detect the relative position of the compensator cup 38 with respect to the X-axis 60 and the second photodetector 78 is aligned along the X-axis 60 so that it can detect the relative position of the compensator cup 38 with respect to the Y-axis 62. The first photodetector 72 has a first detecting area 72A and a second detecting area 72B while the second photodetector 78 has a third detecting area 78A and a fourth detecting area 78B. Each detecting area 72A, 72B, 78A, 78B is basically a distinct photodetector which generates a signal proportional to the amount of light projected onto the detecting area. The line separating the first detecting area 72A from the second detecting area 72B is aligned along the Y-axis 62 while the line separating the third detecting area 72C from the fourth detecting area 72D is aligned along the X-axis 60.

The operation of the first and second position detectors 66 and 68 will be described with respect to the first position detector 66 as the two detectors 66, 68 operate in the same manner. Assuming that the first optical element 70 is an opaque plate having an aperture 90 (i.e. pinhole aperture plate), and that the first optical element 70 and the first photodetector 72 are aligned with the first optical axis 82, each detecting area 72A and 72B will receive an equal amount of light as the dual cell photodetector 72 is aligned with the Y-axis 62. Since the first optical element 70 moves with respect to the first light source 68 and the first photodetector 72, the amount of first light 80 projected onto respective detecting areas 72A and 72B is directly proportional to the position of the first optical element 70, and hence the compensator cup 38. Accordingly, the position of the compensator cup 38 with respect to the X-axis 60 may be determined by evaluating the relative amplitudes of the signals generated by the first detecting area 72A and the second detecting area 72B of the first photodetector 72. Similarly, the position of the compensator cup 38 with respect to the Y-axis 62 may be determined by evaluating the relative amplitudes of the signals generated by the third detecting area 78A and the fourth detecting area 78B of the second photodetector 78.

Figure 5:
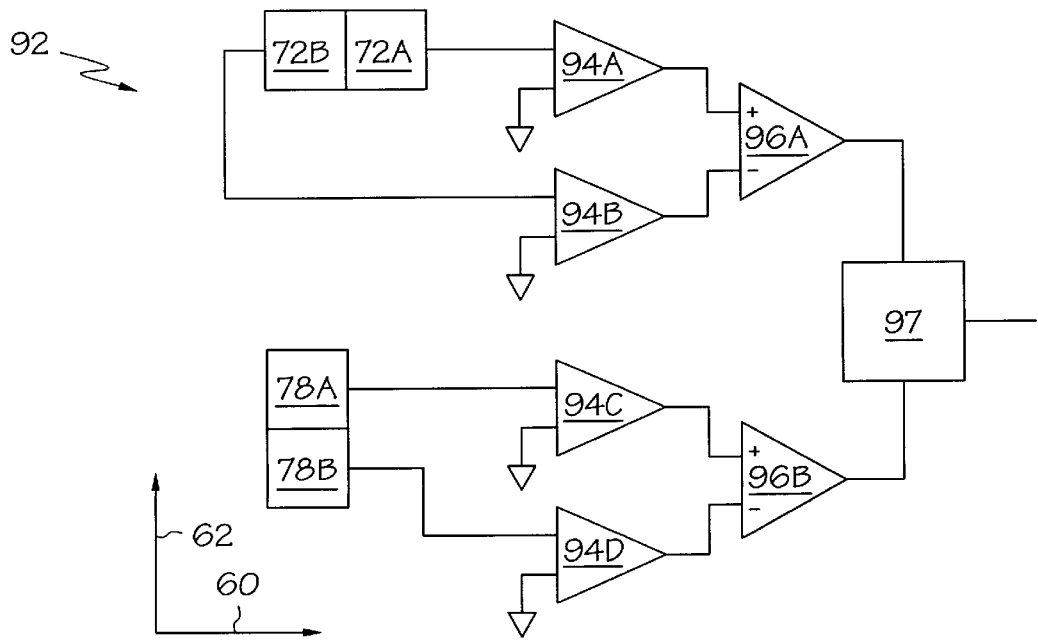
FIG. 5 is a schematic diagram of a detection circuit of the compensator assembly position detector of FIG. 3.

A detection circuit 92 for evaluating the relative amplitudes of the signals is shown in FIG. 5. Each detecting area 72A, 72B, 78A, 78B generates a photocurrent proportional to the intensity of the light illuminating the area. The photocurrents are converted to voltages through transimpedance amplifiers 94A, 94B, 94C, 94D. The voltage output from each respective transimpedance amplifier 94A, 94B, 94C, 94D is directly proportional to the amount of light illuminating the respective detecting area. The voltages from the first and second transimpedance amplifiers 94A, 94B are input into a first differential amplifier 96A while the voltages from the third and fourth transimpedance amplifiers 94C and 94D are input into a second differential amplifier 98B. The differential amplifiers 96A, 96B output a voltage which is proportional to the difference of the input signals. The output voltage of the differential amplifier 96A, which may also be referred to as a first position signal, indicates the relative position of the centroid of illumination along the X-axis 60, and hence, the relative position of the compensator cup 38 along the X-axis 60. Similarly, the output voltage of the differential amplifier 96B, which may also be referred to as a second position signal, indicates the relative position of the centroid of illumination along the Y-axis 62, and hence, the relative position of the compensator cup 38 along the Y-axis 62. The first and second position signals are inputted into a processor 97. The processor 97 is coupled to a printed circuit board (not shown) which is coupled to the focusing mechanism 30. It will be appreciated by those skilled in the art that the processor 97 may be coupled to the laser transmitter 10 in any reasonable manner and location. The processor 97 is programmed to produce a leveling signal in response to the first and second position signals from first and second differential amplifiers 96A, 96B for use in leveling the housing 14, and hence, the compensator assembly 28, as described herein. It will be appreciated by those skilled in the art that other methods may be used to generate the first and second position signals based on the photocurrents generated by the first and second photodetectors 72 and 78.

Figure 6A:
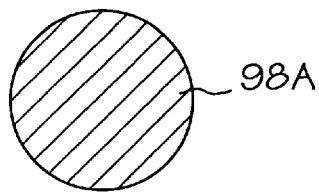
FIGS. 6A–6H are optical elements of the compensator assembly position detector of FIG. 3.
Figure 6B:
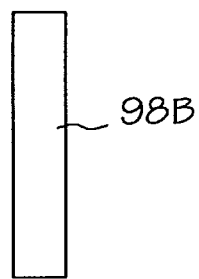
Figure 6C:
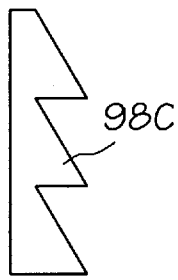
Figure 6D:
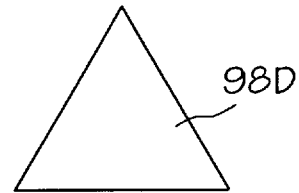
Figure 6E:
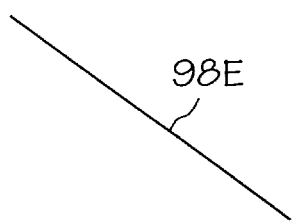
Figure 6F:
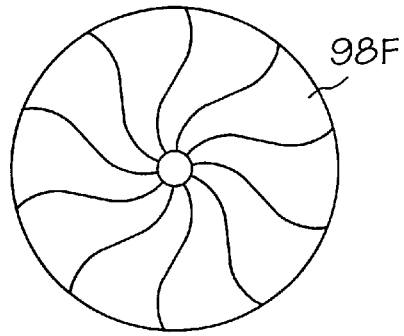
Figure 6G:
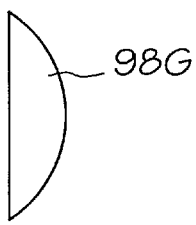
Figure 6H:

The first and second optical elements 70, 76 have been described as comprising opaque plates having the aperture 90. However, there are many different types of optical elements that may be used to accomplish the function of the opaque plates. As shown in FIG. 6A, the first and second optical elements 70, 76 may comprise an opaque shield 98A. The opaque shield 98A will cast a shadow on the detecting areas in direct proportion to the position of the opaque shield 98A such that the position of the compensator cup 38 is determined by evaluating the relative amplitude of light which is projected outside the shadow area. The opaque shield 98A functions the same way as the opaque plate with the aperture 82, just only in reverse. As shown in FIGS. 6B, 6C, 6D and 6E, the optical elements 70, 76 may comprise refractors 98B, diffractors 98C, prisms 98D or mirrors 98E. Depending on the configuration of the above elements, the amount of refraction, diffraction, dispersion or reflection will be directly proportional to the position of the optical element 70, 76 with respect to the respective light source 68, 74 and respective photodetector 72, 78. Finally, as shown in FIGS. 6F, 6G and 6H, the optical elements 70, 76 may comprise irises 98F, lenses 98G or fiber optic cables 98H. It should also be apparent that the optical elements 70, 76 may comprise any combination of the above elements. It will be appreciated by those skilled in the art that other similar optical elements may be used without departing from the scope of the present invention. Preferably, the first and second optical elements 70, 76 are positioned along planes which are substantially perpendicular to respective first and second optical axes 82, 86.

According to the illustrated embodiment in FIG. 3, the first and second optical elements 70, 76 include a truncated cone portion 100 having the aperture 90 positioned substantially adjacent to the respective light sources 68, 74. The truncated cone portion 100 also includes a focusing lens 102 which is positioned substantially adjacent to respective photodetectors 72, 78. The focusing lens 102 focuses the light passed through the aperture 90 so that a more precise position measurement may be made. It should be apparent that the focusing lens 102 may be discarded if the detecting areas of the photodetectors are sufficiently large. The truncated cone portion 100 also includes a shoulder portion 104 which extends over the respective photodetector 72, 78. The shoulder portion 104 helps prevent extraneous light from reaching the respective photodetector 72, 78 which could cause inaccurate position measurements.

The first and second light sources 68, 74 are enclosed in a light source housing 106. The light source housing 106 includes a shoulder portion 108 which extends over the truncated cone portion 100. The shoulder portion 108 helps prevent extraneous light from entering the truncated cone portion 100 through the aperture 90. The light sources 68, 74 may comprise light emitting diodes for generating the first and second lights 80, 84. The light sources 68, 74 may also include diffusers 110. A substantially symmetric and uniform beam of light emerges from the diffuser 110 for more precise and accurate position measurements. It will be appreciated by those skilled in the art that other light sources may be used without departing from the scope of the present invention.

The position signals generated by the detection circuit 92 may be used to adjust the position of the housing 14, so as to level the compensator assembly 28. The position of the housing 14 is adjusted by a leveling assembly 112. The leveling assembly 112 comprises a base 113, a pivot joint 114, a mounting device 116, a first leveling device 118 and a second leveling device 120. The base 113 is coupled to a tripod (not shown) through the mounting device 116 which is positioned substantially in the center of the of the base 113. The base 113 is coupled to the housing 14 via the pivot joint 114 and the first and second leveling devices 118 and 120. The first leveling device 118 includes a first rotatable or adjustable screw 122 while the second leveling device 120 includes a second rotatable or adjustable screw 124. The pivot joint 114, the first adjustable screw 122 and the second adjustable screw 124 are positioned so that the corresponding connection points with the base 113 and the housing 14 form an equilateral triangle. Accordingly, the angle a at each connection point formed by lines intersecting each of the connection points is approximately 60 degrees.

Figure 8:
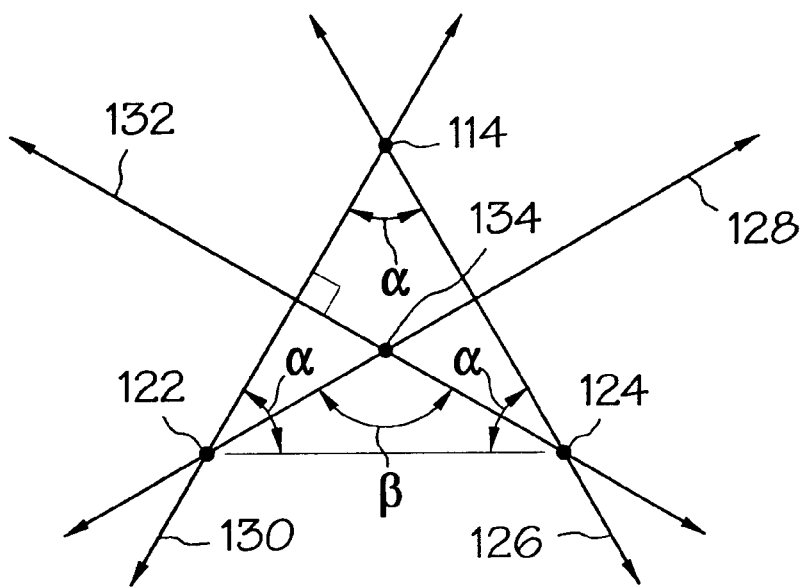
FIG. 8 is a graphical representation of the leveling operation of the leveling device of FIG. 7.

As shown graphically in FIG. 8, rotation of the first adjustable screw 122 causes the housing 14 to pivot about a first pivot axis 126 defined by a line intersecting the connection points of the pivot joint 114 and the second adjustable screw 124. Pivoting the housing 14 about the first pivot axis 126 causes the position of the housing 14 to change with respect to a first axis 128 defined a line perpendicular to the first pivot axis 126 and intersecting the connection point of the first adjustable screw 122. Similarly, rotation of the second adjustable screw 124 causes the housing 14 to pivot about a second pivot axis 130 defined by a line intersecting the connection points of the pivot joint 114 and the first adjustable screw 122. Pivoting the housing about the second pivot axis 130 causes the position of the housing 14 to change with respect to a second axis 132 defined by a line perpendicular to the second pivot axis 130 and intersecting the connection point of the second adjustable screw 124. The intersection of the first and second axes 128 and 132, designated by point 134, corresponds to the center of the base 113 and the housing 14. The compensator assembly 28 is positioned on the housing 14 such that its center of gravity passes through the intersection point 134. Accordingly, the first leveling device 118 is used to adjust the position of the housing 14 with respect to the first axis 128 while the second leveling device 120 is used to adjust the position of the housing 14 with respect to the second axis 132. As the angle a at each connection point is approximately 60 degrees, it follows that an angle β between the first and second axes 128, 132 is approximately 120 degrees. However, it will be appreciated by those skilled in the art that the pivot joint 114, the first adjustable screw 122 and the second adjustable screw 124 may be positioned differently than disclosed above, thereby forming a different angle a and a different angle β, and thus, different first and second axes 128 and 132.

Figure 9:
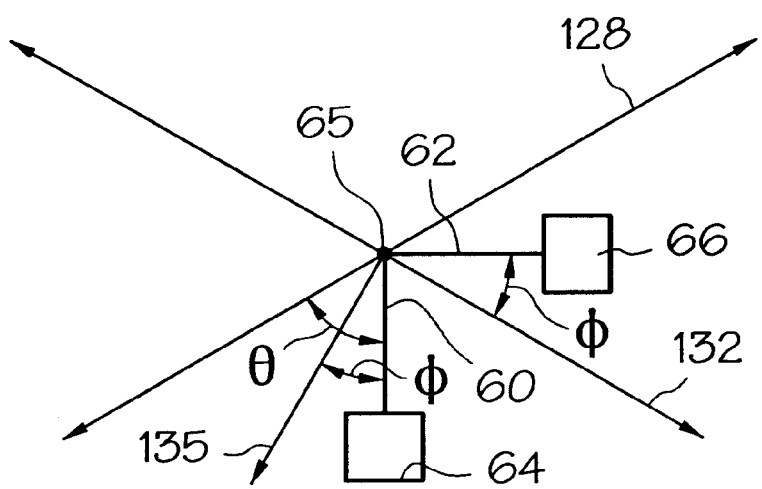
FIG. 9 is a graphical representation of the leveling axes, measurement axes and transformation axes for the leveling device of FIG. 7.

As shown graphically in FIG. 9, the first position detector 64 is offset from the first axis 128 about a common orthogonal axis 65 by a first predetermined number of degrees θ, while the second position detector 66 is offset from the second axis 132 about the common orthogonal axis 65 by a second predetermined number of degrees φ. In the illustrated embodiment, the first predetermined number of degrees θ is approximately 60 degrees while the second predetermined number of degrees φ is approximately 30 degrees. Consequently, data representing the position of the compensator cup 38 with respect to the X and Y axes 60, 62 must be transformed to data representing the position of the compensator cup 38 with respect to the first and second axes 128, 132 as the position of the housing 14 is adjusted with respect to the first and second axis 128, 132. The processor 97 is programmed to perform this transformation and generate the leveling signal so that the first and second leveling devices 118, 120 may be adjusted appropriately so that the compensator assembly 28 is substantially level with respect to the X and Y axes 60, 62.

In the illustrated embodiment, two transformations are performed to transform the position data for the X and Y axes 60, 62 to the position data for the first and second axes 128, 132. The first transformation for transforming Y-axis position data to second axis position data is carried out according to the following equation:

$$y_1 = y \sin(\phi) - x \cos(\phi) \tag{1}$$

where:

$y_1$ defines the position of the compensator cup 38 with respect to the second axis 132;

x defines the position of the compensator cup 38 with respect to the X-axis 60; and y defines the position of the compensator cup 38 with respect to the Y-axis 62.

The second transformation for transforming X-axis position data to first axis position data is carried out according to the following equations:

$$x_1 = x \cos(\phi) + y \sin(\phi); \text{ and} \tag{2}$$

$$x_2 = x_1 \cos(\theta - \phi) + y_1 \sin(\theta - \phi); \tag{3}$$

where:

$x_1$ defines the position of the compensator cup 38 with respect to an intermediate axis 135; and $x_2$ defines the position of the compensator cup 38 with respect to the first axis 128.

Figure 7:
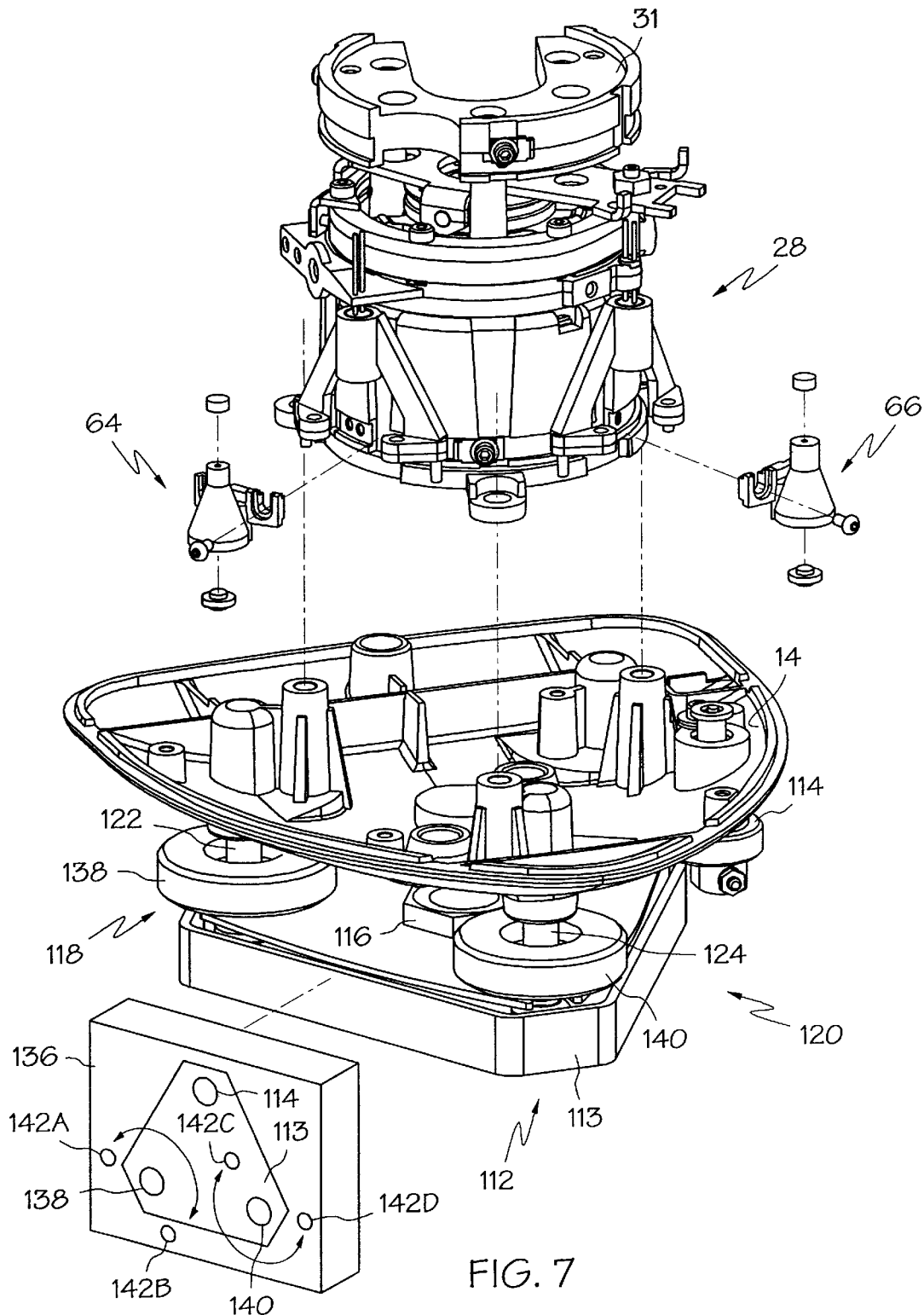
FIG. 7 is a perspective view of a leveling device for the laser transmitter of FIG. 1 according to one embodiment of the present invention.

Once the transformations have been performed and the leveling signal generated from the processor 97, the leveling signal may be used in leveling the compensator assembly 28. Referring again to FIG. 7, the leveling signal is used for manually adjusting the position of the housing 14, and hence, the compensator assembly 28, according to an embodiment of the present invention. In the manual mode, the laser transmitter 10 includes an indicator device 136 while the first leveling device 118 includes a first rotatable knob 138 coupled to the first adjustable screw 122 and the second leveling device 120 includes a second rotatable knob 140 coupled to the second adjustable 124. Rotation of the rotatable knobs 138, 140 causes rotation of the corresponding adjustable screw 122, 124. The indicator device 136 includes a graphical representation of the base 113, the pivot joint 114, the first rotatable knob 138 and the second rotatable knob 140. In addition, the indicator device 136 provides an indication of the direction in which to rotate the first and second rotatable knobs 138, 140 through a plurality of indicator displays 142A–142D. In the illustrated embodiment, the indicator displays 142A–142D comprise light emitting devices (LEDs) which light up appropriately in response to the leveling signal from the processor 97. The LEDs will remain "on" until the appropriate knob 138, 140 has been turned in the proper direction the required number of degrees. For example, if LED 142C is "on," the operator will turn the second rotatable knob 140 clockwise until the LED 142C is turned "off." At this point, the operator will know the second rotatable knob 140 has been adjusted as required. If the other LEDs 142A–142D are also "off," the compensator assembly 28 is level within at least 12 minutes with respect to the X and Y axes 60, 62. The laser beam 12 projected from the light source 16 through the compensator assembly 28 will also be substantially plumb. It will be appreciated by those skilled in the art that the indicator displays 142A–142D may comprise other types of devices which generate light as well as appropriate non-light generating devices. It will be further appreciated by those skilled in the art that the entire indicator device 136 or a desired portion thereof may comprise a liquid crystal display or video monitor for indicating which knob 138, 140 to rotate and in which direction.

Figure 10:
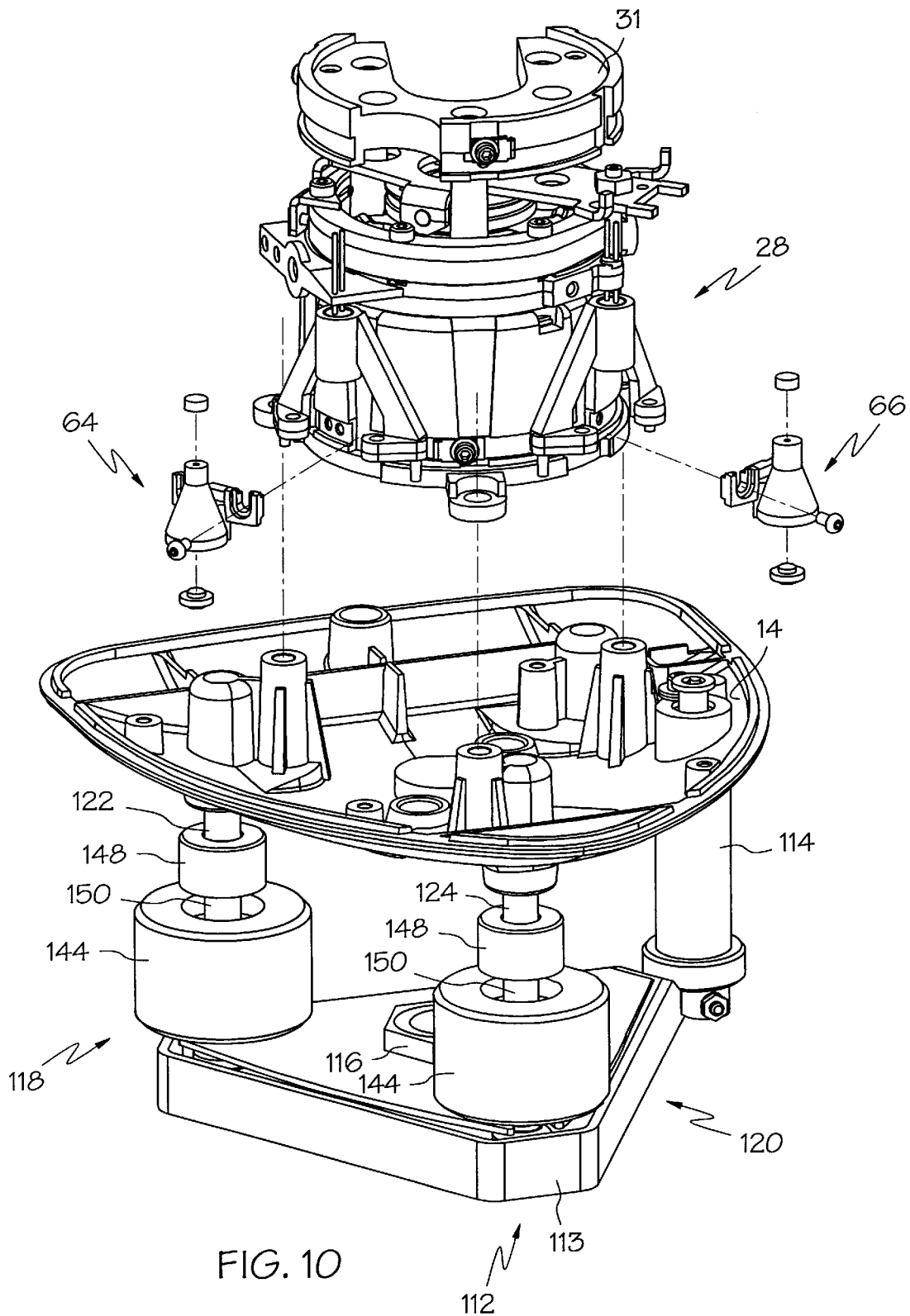
FIG. 10 is a perspective view of the leveling device for the laser transmitter of FIG. 1 according to another embodiment of the present invention.

The housing 14 may be adjusted automatically according to another embodiment of the present invention. As shown in FIG. 10, the first and second rotatable knobs 138, 140 are replaced by first and second motors 144, 146. The motors 144 and 146 are directly coupled to the adjustable screws 122 and 124 through a coupling 148. The coupling connects a shaft 150 of each motor 144, 146 to the corresponding adjustable screw 122, 124. It will be appreciated by those skilled in the art that the motors 144, 146 may be coupled to the adjustable screws 122, 124 in a variety of different ways, such as by using appropriate gears and/or belts. The motors 144 and 146 are controlled by the processor 97 based on the leveling signal. As the processor 97 generates the leveling signal in response to the first and second position signals and controls the motors 144, 146 based on the leveling signal, adjustment of the housing 14 and eventual leveling of the compensator assembly 28 is performed automatically.

It will be appreciated by those skilled in the art that the manual and automatic leveling operations are not restricted to the disclosed leveling assembly 112. It will be further appreciated that other leveling devices controlled by the processor 97 may be used to adjust the position of the housing 14 or the compensator assembly 28 with respect to the X and Y axes 60, 62 without departing from the scope of the present invention. While the position data for leveling the compensator assembly 28, has been described in relation to measuring the relative position of the compensator assembly 28 or cup 38, it will be appreciated by those skilled in the art that the position data may be determined with respect to other components. For example, the disclosed position detectors 64, 66, or similarly configured position detectors, may be positioned to measure directly the position of the housing 14 with respect to the X and Y axes 60, 62. Accordingly, the position measurements and leveling operations would be performed with respect to the housing 14. As long as the compensator assembly 28 is positioned properly with respect to the housing 14, the compensator assembly 28 should be level once the housing 14 is level. It will be appreciated by those skilled in the art that the present invention may be used with any type of laser transmitter or other types of devices which requires leveling.

Having described the invention in detail and by reference to preferred embodiments thereof, it will be apparent that modifications and variations are possible without departing from the scope of the invention which is defined in the appended claims.

What is claimed is:

1. An apparatus comprising:
    a housing;
    a first position detector generating a first position signal representative of a position of said housing with respect to an X-axis;
    a second position detector generating a second position signal representative of a position of said housing with respect to a Y-axis, said X-axis intersecting said Y-axis;
    a leveling assembly coupled to said housing for adjusting a position of said housing with respect to said X-axis and with respect to said Y-axis, said leveling assembly comprising a first leveling device for adjusting said position of said housing with respect to a first axis and a second leveling device for adjusting said position of said housing with respect to a second axis, said first axis being offset from said X-axis about a common orthogonal axis by a first predetermined number of degrees ($\theta$) and said second axis being offset from said Y-axis about said common orthogonal axis by a second predetermined number of degrees ($\phi$); and
    a processor programmed to transform said first and second X-axis and Y-axis position signals into a leveling signal by performing a transformation in response to said first position signal representative of a position of said housing with respect to said X-axis and in response to said second position signal representative of a position of said housing with respect to said Y-axis to produce said leveling signal, said leveling signal representing an adjustment of said first leveling device about said first axis offset from said X-axis about said common orthogonal axis by said first predetermined number of degrees ($\theta$) and an adjustment of said second leveling device about said second axis offset from said Y-axis about said common orthogonal axis by said second predetermined number of degrees ($\phi$).

2. The apparatus of claim 1, wherein said transformation comprises a first transformation function for use in adjusting one of said first and second leveling devices and a second transformation function for use in adjusting the other of said first and second leveling devices.

3. The apparatus of claim 1, wherein said first axis is separated from said second axis by about 120 degrees and said first predetermined number of degrees is about 30 and said second predetermined number of degrees is about 60.

4. The apparatus of claim 1, wherein said first leveling device comprises a first motor and said second leveling device comprises a second motor, said first and second motors receiving said leveling signal from said processor such that said processor automatically controls said position of said housing with respect to said first and second axes so that said housing is substantially level with respect to said X-axis and with respect to said Y-axis.

5. The apparatus of claim 1, wherein said X-axis is substantially orthogonal to said Y-axis.

6. An apparatus comprising:
    a housing;
    a first position detector generating a first position signal representative of a position of said housing with respect to an X-axis;
    a second position detector generating a second position signal representative of a position of said housing with respect to a Y-axis, said X-axis intersecting said Y-axis;

a leveling assembly coupled to said housing for adjusting a position of said housing with respect to said X-axis and with respect to said Y-axis, said leveling assembly comprising a first leveling device for adjusting said position of said housing with respect to a first axis and a second leveling device for adjusting said position of said housing with respect to a second axis, said first axis being offset from said X-axis by a first predetermined number of degrees (θ) and said second axis being offset from said Y-axis by a second predetermined number of degrees (φ); and a processor programmed to perform a transformation in response to said first and second position signals to produce a leveling signal, said leveling signal being used for adjustment of said first and second leveling devices about said first and second axes, respectively, so that said housing is substantially level with respect to said X-axis and said Y-axis, wherein said transformation comprises a first transformation function for use in adjusting one of said first and second leveling devices and a second transformation function for use in adjusting the other of said first and second leveling devices, and wherein said first transformation function is carried out according to the following equation:

$$y_1 = y\sin(\phi) - x\cos(\phi)$$

where:
y$_1$ defines the position of said housing with respect to said second axis;
x defines the position of said housing with respect to said X-axis; and
y defines the position of said housing with respect to said Y-axis.

7. The apparatus of claim 6, wherein said second transformation function is carried out according to the following equations:

$$x_1 = x\cos(\phi) + y\sin(\phi); \text{ and}$$
$$x_2 = x_1\cos(\theta - \phi) + y_1\sin(\theta - 100);$$

wherein:
x$_1$ defines the position of said housing with respect to an intermediate axis; and
x$_2$ defines the position of said housing with respect to said first axis.

8. An apparatus comprising:

a housing;

a first position detector generating a first position signal representative of a position of said housing with respect to an X-axis;

a second position detector generating a second position signal representative of a position of said housing with respect to a Y-axis, said X-axis intersecting said Y-axis;

a leveling assembly coupled to said housing for adjusting a position of said housing with respect to said X-axis and with respect to said Y-axis, said leveling assembly comprising a first leveling device for adjusting said position of said housing with respect to a first axis and a second leveling device for adjusting said position of said housing with respect to a second axis, said first axis being offset from said X-axis by a first predetermined number of degrees (θ) and said second axis being offset from said Y-axis by a second predetermined number of degrees (φ), wherein said first leveling device comprises a first rotatable knob and said second leveling device comprises a second rotatable knob;

a processor programmed to perform a transformation in response to said first and second position signals to produce a leveling signal, said leveling signal being used for adjustment of said first and second leveling devices about said first and second axes, respectively, so that said housing is substantially level with respect to said X-axis and said Y-axis; and an indicator device having a first display representation for said first rotatable knob and a second display representation for said second rotatable knob, said indicator device receiving said leveling signal from said processor and indicating a direction to rotate said first and second rotatable knobs to adjust said position of said housing with respect to said first and second axes so that said housing is substantially level with respect to said X-axis and with respect to said Y-axis.

9. A laser transmitting device comprising a housing;

a laser light source coupled to said housing and generating laser light;

a compensator assembly coupled to said housing, said compensator assembly receiving and projecting said laser light along a projection axis;

a first compensator assembly position detector generating a first position signal representative of a position of said compensator assembly with respect to an X-axis;

a second compensator assembly position detector generating a second position signal representative of a position of said compensator assembly with respect to a Y-axis, said X-axis intersecting said Y-axis;

a leveling assembly coupled to said housing for adjusting a position of said housing with respect to said X-axis and with respect to said Y-axis, said leveling assembly comprising a first leveling device for adjusting said position of said housing with respect to a first axis and a second leveling device for adjusting said position of said housing with respect to a second axis, said first axis being offset from said X-axis about a common orthogonal axis by a first predetermined number of degrees (θ) and said second axis being offset from said Y-axis about said common orthogonal axis by a second predetermined number of degrees (φ); and a processor programmed to transform said first and second X-axis and Y-axis position signals into a leveling signal by performing a transformation in response to said first position signal representative of a position of said housing with respect to said X-axis and in response to said second position signal representative of a position of said housing with respect to said Y-axis to produce said leveling signal, said leveling signal representing an adjustment of said first leveling device about said first axis offset from said X-axis about said common orthogonal axis by said first predetermined number of degrees (θ) and an adjustment of said second leveling device about said second axis offset from said Y-axis about said common orthogonal axis by said second predetermined number of degrees (φ).

10. The laser transmitting device of claim 9, wherein said transformation comprises a first transformation function for use in adjusting one of said first and second leveling devices and a second transformation function for use in adjusting the other of said first and second leveling devices.

11. The laser transmitting device of claim 9, wherein said first axis is separated from said second axis by about 120 degrees and said first predetermined number of degrees is about 30 and said second predetermined number of degrees is about 60.

12. The laser transmitting device of claim 9, wherein said first leveling device comprises a first motor and said second leveling device comprises a second motor, said first and second motors receiving said leveling signal from said processor such that said processor automatically controls said position of said housing with respect to said first and second axes so that said compensator assembly is substantially level with respect to said X-axis and with respect to said Y-axis.

13. The laser transmitting device of claim 9, wherein said X-axis is substantially orthogonal to said Y-axis.

14. A laser transmitting device comprising a housing;

a laser light source coupled to said housing and generating laser light;

a compensator assembly coupled to said housing, said compensator assembly receiving and projecting said laser light along a projection axis;

a first compensator assembly position detector generating a first position signal representative of a position of said compensator assembly with respect to an X-axis;

a second compensator assembly position detector generating a second position signal representative of a position of said compensator assembly with respect to a Y-axis, said X-axis intersecting said Y-axis;

a leveling assembly coupled to said housing for adjusting a position of said housing with respect to said X-axis and with respect to said Y-axis, said leveling assembly comprising a first leveling device for adjusting said position of said housing with respect to a first axis and a second leveling device for adjusting said position of said housing with respect to a second axis, said first axis being offset from said X-axis by a first predetermined number of degrees ($\theta$) and said second axis being offset from said Y-axis by a second predetermined number of degrees ($\phi$); and a processor programmed to perform a transformation in response to said first and second signals to produce a leveling signal, said leveling signal being used for adjustment of said first and second leveling devices about said first and second axes, respectively, so that said compensator assembly is substantially level with respect to said X-axis and said Y-axis, wherein said transformation comprises a first transformation function for use in adjusting one of said first and second leveling devices and a second transformation function for use in adjusting the other of said first and second leveling devices, wherein said first transformation function is carried out according to the following equation:

$$y1 = y \sin(\phi) - x \cos(\phi)$$

where:
  y1 defines the position of said compensator assembly with respect to said second axis;
  x defines the position of said compensator assembly with respect to said X-axis; and
  y defines the position of said compensator assembly with respect to said Y-axis.

15. The laser transmitting device of claim 14, wherein said second transformation function is carried out according to the following equations:

$$x1 = x \cos(\phi) + y \sin(\phi); \text{ and}$$

$$x2 = x1 \cos(\theta - \phi) + y1 \sin(\theta - \phi);$$

wherein:
  x1 defines the position of said compensator assembly with respect to an intermediate axis; and
  x2 defines the position of said compensator assembly with respect to said first axis.

16. A laser transmitting device comprising a housing;

a laser light source coupled to said housing and generating laser light;

a compensator assembly coupled to said housing, said compensator assembly receiving and projecting said laser light along a projection axis;

a first compensator assembly position detector generating a first position signal representative of a position of said compensator assembly with respect to an X-axis;

a second compensator assembly position detector generating a second position signal representative of a position of said compensator assembly with respect to a Y-axis, said X-axis intersecting said Y-axis;

a leveling assembly coupled to said housing for adjusting a position of said housing with respect to said X-axis and with respect to said Y-axis, said leveling assembly comprising a first leveling device for adjusting said position of said housing with respect to a first axis and a second leveling device for adjusting said position of said housing with respect to a second axis, said first axis being offset from said X-axis by a first predetermined number of degrees ($\theta$) and said second axis being offset from said Y-axis by a second predetermined number of degrees ($\phi$), wherein said first leveling device comprises a first rotatable knob and said second leveling device comprises a second rotatable knob;

processor programmed to perform a transformation in response to said first and second signals to produce a leveling signal, said leveling signal being used for adjustment of said first and second leveling devices about said first and second axes, respectively, so that said compensator assembly is substantially level with respect to said X-axis and said Y-axis; and an indicator device having a first display representation for said first rotatable knob and a second display representation for said second rotatable knob, said indicator device receiving said leveling signal from said processor and indicating a direction to rotate said first and second rotatable knobs to adjust said position of said housing with respect to said first and second axes so that said compensator assembly is substantially level with respect to said X-axis and with respect to said Y-axis.

17. A laser transmitting device comprising a housing;

a laser light source coupled to said housing and generating laser light;

a compensator assembly coupled to said housing, said compensator assembly receiving and projecting said laser light along a projection axis;

a first compensator assembly position detector generating a first position signal representative of a position of said compensator assembly with respect to an X-axis;

a second compensator assembly position detector generating a second position signal representative of a position of said compensator assembly with respect to a Y-axis, said X-axis intersecting said Y-axis;

a leveling assembly coupled to said housing for adjusting a position of said housing with respect to said X-axis and with respect to said Y-axis, said leveling assembly comprising a first leveling device having a first rotatable knob coupled thereto for adjusting said position of said housing with respect to a first axis and a second leveling device having a second rotatable knob coupled thereto for adjusting said position of said housing with respect to a second axis, said first axis being offset from said X-axis by a first predetermined number of degrees ($\theta$) and said second axis being offset from said Y-axis by a second predetermined number of degrees ($\phi$); and an indicator device having a first display representation for said first rotatable knob and a second display representation for said second rotatable knob, said indicator device indicating a direction to rotate said first and second rotatable knobs in response to said first and second position signals to adjust said position of said housing with respect to said first and second axes so that said compensator assembly is substantially level with respect to said X-axis and with respect to said Y-axis.

18. A laser transmitting device comprising a housing;

a laser light source coupled to said housing and generating laser light;

a compensator assembly coupled to said housing, said compensator assembly receiving and projecting said laser light along a projection axis;

a first compensator assembly position detector generating a first position signal representative of a position of said compensator assembly with respect to an X-axis;

a second compensator assembly position detector generating a second position signal representative of a position of said compensator assembly with respect to a Y-axis, said X-axis intersecting said Y-axis;

a leveling assembly coupled to said housing for adjusting a position of said housing with respect to said X-axis and with respect to said Y-axis, said leveling assembly comprising a first leveling device having a first rotatable knob coupled thereto for adjusting said position of said housing with respect to a first axis and a second leveling device having a second rotatable knob coupled thereto for adjusting said position of said housing with respect to a second axis, said first axis being offset from said X-axis by a first predetermined number of degrees ($\theta$) and said second axis being offset from said Y-axis by a second predetermined number of degrees ($\phi$);

a processor programmed to perform a transformation in response to said first and second position signals to produce a leveling signal, said transformation being carried out according to the following equations:

$y_1 = y \sin(\phi) - x \cos(\phi);$ $x_1 = x \cos(\phi) + y \sin(\phi);$ and $x_2 = x_1 \cos(\theta - \phi) + y_1 \sin(\theta - 100);$ wherein:
$y_1$ defines the position of said compensator assembly with respect to said second axis;
$x_1$ defines the position of said compensator assembly with respect to an intermediate axis;
$x_2$ defines the position of said compensator assembly with respect to said first axis;
x defines the position of said compensator assembly with respect to said X-axis; and
y defines the position of said compensator assembly with respect to said Y-axis;

and;

an indicator device having a first display representation for said first rotatable knob and a second display representation for said second rotatable knob, said indicator device indicating a direction to rotate said first and second rotatable knobs in response to said leveling signal from said processor to adjust said position of said housing with respect to said first and second axes so that said compensator assembly is substantially level with respect to said X-axis and with respect to said Y-axis.

19. A process for leveling a housing with respect to an X-axis and with respect to a Y-axis, said X-axis intersecting said Y-axis, a position of said housing being adjusted with respect to a first axis and a second axis, said first axis being offset from said X-axis about a common orthogonal axis by a first predetermined number of degrees ($\theta$) and said second axis being offset from said Y-axis about a common orthogonal axis by a second predetermined number of degrees ($\phi$), said process comprising:

determining said position of said housing with respect to said X-axis and said Y-axis and generating position data representative of said position of said housing with respect to said X-axis and said Y-axis;

transforming said position data representative of said position of said housing with respect to said X-axis and said Y-axis to transformation data representative of said position of said housing with respect to said first axis offset from said X-axis about said common orthogonal axis and said second axis offset from said Y-axis about a common orthogonal axis; and adjusting said position of said housing with respect to said first axis offset from said X-axis about said common orthogonal axis by said first predetermined number of degrees ($\theta$) and with respect to said second axis offset from said Y-axis about said common orthogonal axis by said second predetermined number of degrees ($\phi$), whereby said housing is leveled by determining said position of said housing with respect to said X-axis and said Y-axis and adjusting said position of said housing with respect to said first axis and said second axis.

20. A process for leveling a housing with respect to an X-axis and with respect to a Y-axis, said X-axis intersecting said Y-axis, a position of said housing being adjusted with respect to a first axis and a second axis, said first axis being offset from said X-axis by a first predetermined number of degrees ($\theta$) and said second axis being offset from said Y-axis by a second predetermined number of degrees ($\phi$), said process comprising:

determining said position of said housing with respect to said X-axis and said Y-axis and generating position data representative thereof;

transforming said position data to transformation data representative of said position of said housing with respect to said first axis and said second axis; and adjusting said position of said housing with respect to said first axis and second axis based on said transformation data so that said housing is substantially level with respect to said X-axis and said Y-axis, wherein said step of transforming said position data to transformation data representative of said position of said housing with respect to said first axis and said second axis comprises determining said transformation data according to the following equations:

$y_1 = y \sin(\phi) - x \cos(\phi);$ $x_1 = x \cos(\phi) + y \sin(\phi);$ and $x_2 = x_1 \cos(\theta - \phi) + y_1 \sin(\theta - \phi);$ where:
$y_1$ defines the position of said housing with respect to said second axis;
$x_1$ defines the position of said housing with respect to an intermediate axis;

x₂ defines the position of said housing with respect to said first axis;

x defines the position of said housing with respect to said X-axis; and y defines the position of said housing with respect to said Y-axis.

21. The process of claim 20, wherein said step of adjusting said position of said housing with respect to said first axis and second axis based on said transformation data so that said housing is substantially level with respect to said X-axis and said Y-axis is performed manually.

22. The process of claim 20, wherein said step of adjusting said position of said housing with respect to said first axis and second axis based on said transformation data so that said housing is substantially level with respect to said X-axis and said Y-axis is performed automatically.

23. The process of claim 20, wherein said step of adjusting said position of said housing with respect to said first axis and second axis based on said transformation data so that said housing is substantially level with respect to said X-axis and said Y-axis comprises indicating a direction to adjust said position of said housing with respect to said first axis and with respect to said second axis.

24. The process of claim 23, wherein said step of indicating a direction to adjust said position of said housing with respect to said first axis and with respect to said second axis comprises indicating a first direction to rotate a first rotatable knob coupled to a first leveling device for adjusting said position of said housing with respect to said first axis and indicating a second direction to rotate a second rotatable knob coupled to a second leveling device for adjusting said position of said housing with respect to said second axis.

25. A process for leveling a housing with respect to an X-axis and with respect to a Y-axis, said X-axis intersecting said Y-axis, a position of said housing being adjusted with respect to a first axis and a second axis, said first axis being offset from said X-axis about a common orthogonal axis by a first predetermined number of degrees (θ) and said second axis being offset from said Y-axis about said common orthogonal axis by a second predetermined number of degrees (φ), said process comprising:

determining said position of said housing with respect to said X-axis and said Y-axis and generating position data representative of said position of said housing with respect to said X-axis and said Y-axis; and indicating a direction to adjust said housing with respect to said first axis offset from said X-axis about said common orthogonal axis by said first predetermined number of degrees (θ) and with respect to said second axis offset from said Y-axis about said common orthogonal axis by said second predetermined number of degrees (φ) in response to said position data, whereby said housing is leveled by determining said position of said housing with respect to said X-axis and said Y-axis and adjusting said position of said housing with respect to said first axis and said second axis.

26. A process for adjusting a position of a laser transmitter with respect to a first axis and a second axis, said process comprising:

generating laser light from a light source;

directing said laser light along a projection axis using a compensator assembly coupled to said laser transmitter;

determining a position of said compensator assembly with respect to an X-axis and a Y-axis and generating position data representative of said position of said housing with respect to said X-axis and said Y-axis, said first axis being offset from said X-axis about a common orthogonal axis by a first predetermined number of degrees (θ) and said second axis being offset from said Y-axis about said common orthogonal axis by a second predetermined number of degrees (φ);

transforming said position data representative of said position of said housing with respect to said X-axis and said Y-axis to transformation data representative of said position of said compensator assembly with respect to said first axis offset from said X-axis about said common orthogonal axis by a first predetermined number of degrees (θ) and said second axis offset from said Y-axis about said common orthogonal axis by said second predetermined number of degrees (φ); and adjusting said position of said laser transmitter with respect to said first axis offset from said X-axis about said common orthogonal axis by said first predetermined number of degrees (θ) and with respect to said second axis offset from said Y-axis about said common orthogonal axis by said second predetermined number of degrees (φ) based on said transformation data, whereby said housing is leveled by determining said position of said housing with respect to said X-axis and said Y-axis and adjusting said position of said housing with respect to said first axis and said second axis.

27. A process for adjusting a position of a laser transmitter with respect to a first axis and a second axis, said process comprising:

generating laser light from a light source;

directing said laser light along a projection axis using a compensator assembly coupled to said laser transmitter;

determining a position of said compensator assembly with respect to an X-axis and a Y-axis and generating position data representative thereof, said first axis being offset from said X-axis by a first predetermined number of degrees (θ) and said second axis being offset from said Y-axis by a second predetermined number of degrees (φ);

transforming said position data to transformation data representative of said position of said compensator assembly with respect to said first axis and said second axis; and adjusting said position of said laser transmitter with respect to said first axis and second axis based on said transformation data so that said laser transmitter is substantially level with respect to said X-axis and said Y-axis, wherein said step of transforming said position data to transformation data representative of said position of said compensator assembly with respect to said first axis and said second axis comprises determining said transformation data according to the following equations:

$$y_1 = y \sin(\phi) - x \cos(\phi);$$

$$x_1 = x \cos(\phi) + y \sin(\phi); \text{ and}$$

$$x_2 = x_1 \cos(\theta - \phi) + y_1 \sin(\theta - \phi);$$

where:

y₁ defines the position of said compensator assembly with respect to said second axis;

x₁ defines the position of said compensator assembly with respect to an intermediate axis;

x₂ defines the position of said compensator assembly with respect to said first axis;

x defines the position of said compensator assembly with respect to said X-axis; and y defines the position of said compensator assembly with respect to said Y-axis.

* * * * *

UNITED STATES PATENT AND TRADEMARK OFFICE
CERTIFICATE OF CORRECTION

PATENT NO. : 6,088,623    Page 1 of 1
DATED : July 11, 2000
INVENTOR(S) : Yowler et al.

It is certified that error appears in the above-identified patent and that said Letters Patent is hereby corrected as shown below:

<u>Column 17,</u>
Line 39, "sin (θ-100);" should read -- sin (θ-φ); --

<u>Column 20,</u>
Line 31, "; processor" should read -- ; a processor --

<u>Column 21,</u>
Line 50, "$y_1$ sin (θ-100);" should read -- $y_1$ sin (θ-φ); --

Signed and Sealed this

Fourteenth Day of August, 2001

*Attest:*

NICHOLAS P. GODICI
*Attesting Officer*    *Acting Director of the United States Patent and Trademark Office*